(12) United States Patent
Bedi et al.

(10) Patent No.: US 9,697,595 B2
(45) Date of Patent: Jul. 4, 2017

(54) CONTENT AWARE FILL BASED ON SIMILAR IMAGES

(71) Applicant: Adobe Systems Incorporated, San Jose, CA (US)

(72) Inventors: Ajay Bedi, Uttar Pradesh (IN); Sourabh Gupta, Uttar Pradesh (IN); Saurabh Gupta, Uttar Pradesh (IN)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 229 days.

(21) Appl. No.: 14/554,321

(22) Filed: Nov. 26, 2014

(65) Prior Publication Data

US 2016/0148362 A1     May 26, 2016

(51) Int. Cl.
    *G06K 9/36*     (2006.01)
    *G06T 5/50*     (2006.01)
    *G06T 5/00*     (2006.01)

(52) U.S. Cl.
    CPC ............ *G06T 5/50* (2013.01); *G06T 5/005* (2013.01); *G06T 2207/20224* (2013.01)

(58) Field of Classification Search
CPC   G06T 5/50; G06T 7/0097; G06T 2207/20224
USPC ................................................ 382/180, 284
See application file for complete search history.

(56) References Cited

U.S. PATENT DOCUMENTS

| | | | |
|---|---|---|---|
| 4,925,294 A | 5/1990 | Geshwind et al. | |
| 6,133,946 A | 10/2000 | Cavallaro et al. | |
| 6,441,846 B1 | 8/2002 | Carlbom et al. | |
| 7,418,131 B2 | 8/2008 | Wang et al. | |
| 7,856,055 B2 | 12/2010 | Zhou et al. | |
| 8,121,347 B2 | 2/2012 | Metaxas et al. | |
| 8,249,299 B1* | 8/2012 | Dhawan | G06T 7/2033 348/169 |
| 8,615,111 B2 | 12/2013 | Garten | |
| 8,620,029 B2 | 12/2013 | Dhawan et al. | |
| 9,087,402 B2 | 7/2015 | Doolittle | |

(Continued)

OTHER PUBLICATIONS

Criminisi, et al., "Region Filling and Object Removal by Exemplar-Based Image Inpainting", IEEE Transactions on Image Processing, vol. 13, No. 9, pp. 1-13 (Sep. 2004).

(Continued)

*Primary Examiner* — Andrew Moyer
(74) *Attorney, Agent, or Firm* — Finch & Maloney PLLC

(57) ABSTRACT

A user identifies an unwanted object in a source image. Related images are identified on the basis of timestamp and/or geolocation metadata. Matching masks are identified in the source image, wherein each of the matching masks is adjacent to the selection mask. Features in the selection and matching masks which also appear in one of the related images are identified. The related image having a maximum of features which are tracked to a source image matching mask, but also a minimum of features which are tracked to the source image selection mask, is identified as a best-match related image. By mapping the source image matching masks onto the best-match related image, a seed region can be located in the best-match related image. This seed region is used for filling in the source image. This allows the unwanted object to be replaced with a visually plausible background having a reasonable appearance.

20 Claims, 10 Drawing Sheets
(8 of 10 Drawing Sheet(s) Filed in Color)

(56) References Cited

U.S. PATENT DOCUMENTS

| | | |
|---|---|---|
| 2005/0129324 A1 | 6/2005 | Lemke |
| 2006/0192867 A1 | 8/2006 | Yosefin |
| 2007/0031003 A1 | 2/2007 | Cremers |
| 2010/0027961 A1 | 2/2010 | Gentile |
| 2010/0296748 A1 | 11/2010 | Shechtman et al. |
| 2011/0050864 A1 | 3/2011 | Bond |
| 2011/0091127 A1 | 4/2011 | Kisilev |
| 2011/0103644 A1* | 5/2011 | Garten ............ G06T 5/005 382/103 |
| 2012/0051429 A1 | 3/2012 | Kim |
| 2012/0092357 A1 | 4/2012 | Wang et al. |
| 2012/0213404 A1* | 8/2012 | Steiner ........ G06F 17/30256 382/103 |
| 2013/0021368 A1* | 1/2013 | Lee ............ H04N 1/00153 345/619 |
| 2013/0051685 A1* | 2/2013 | Shechtman ........ G06T 11/60 382/218 |
| 2014/0169667 A1 | 6/2014 | Xiong et al. |
| 2015/0156468 A1 | 6/2015 | Moriguchi |
| 2015/0297949 A1 | 10/2015 | Aman |

OTHER PUBLICATIONS

Tomasi, et al., "Detection and Tracking of Point Features", Carnegie Mellon University Technical Report CMU-CS-91-132 (Apr. 1991).
Notice of Allowance received in U.S. Appl. No. 15/088,289 (sent Feb. 3, 2017) (12 pages).

* cited by examiner

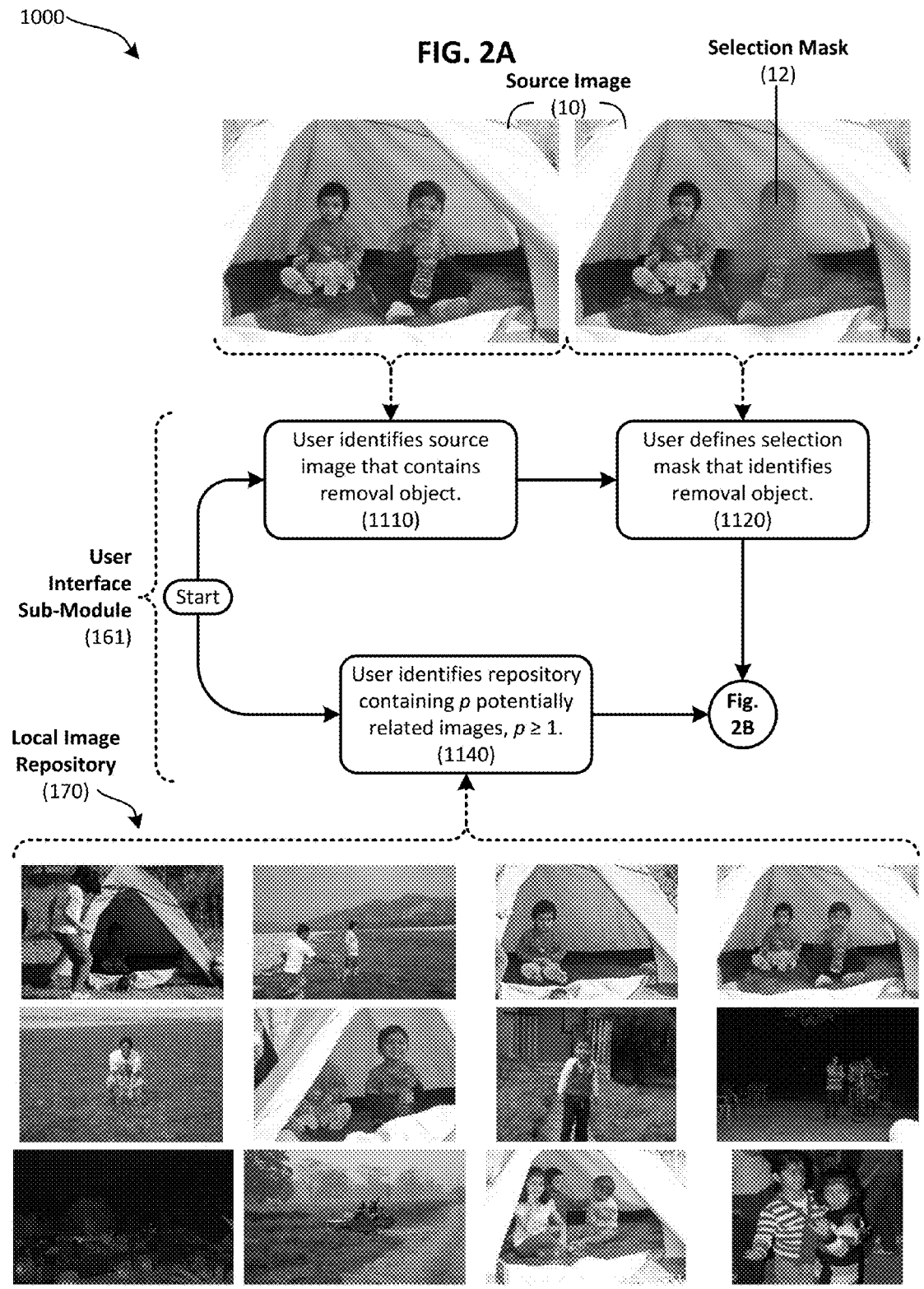

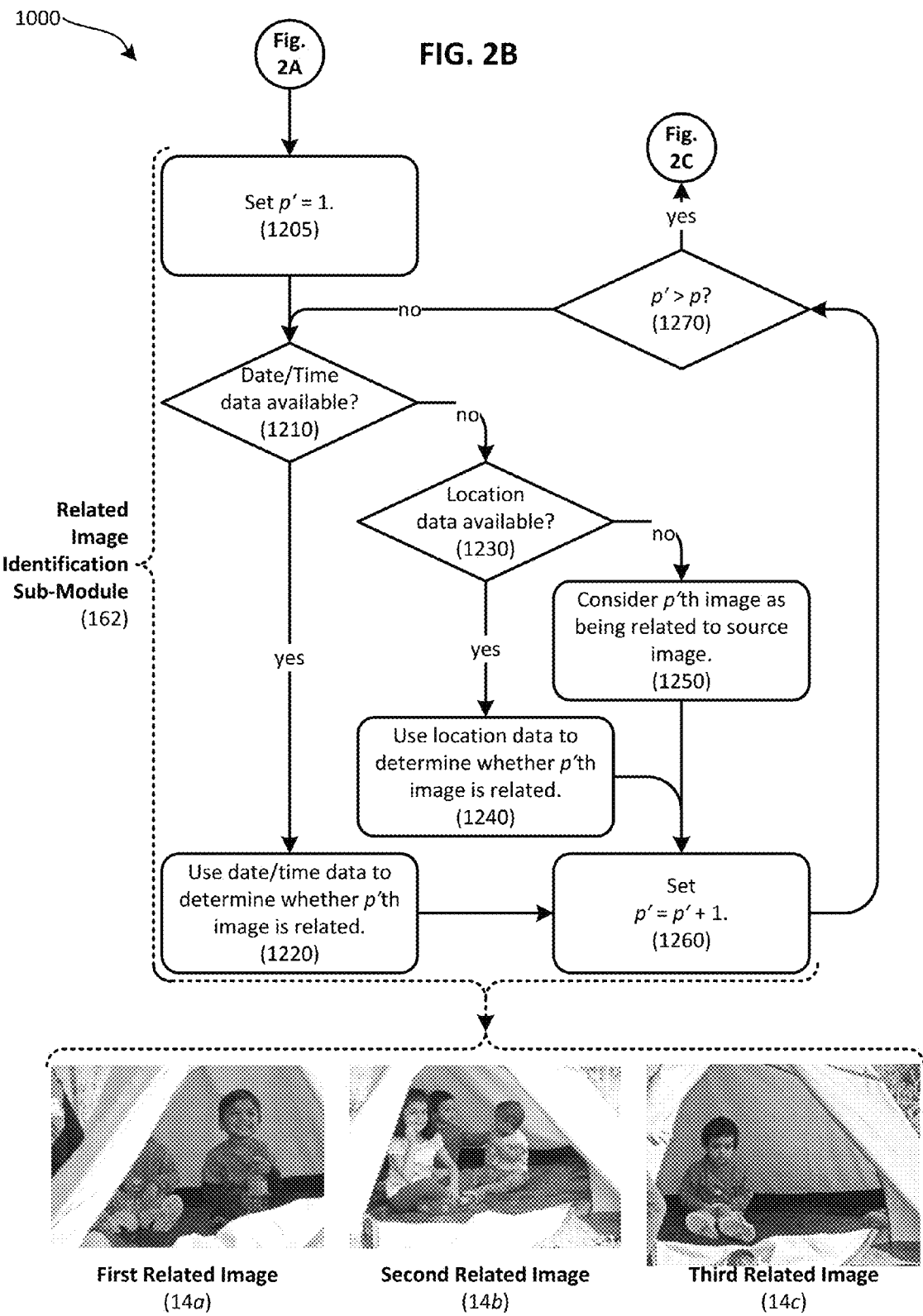

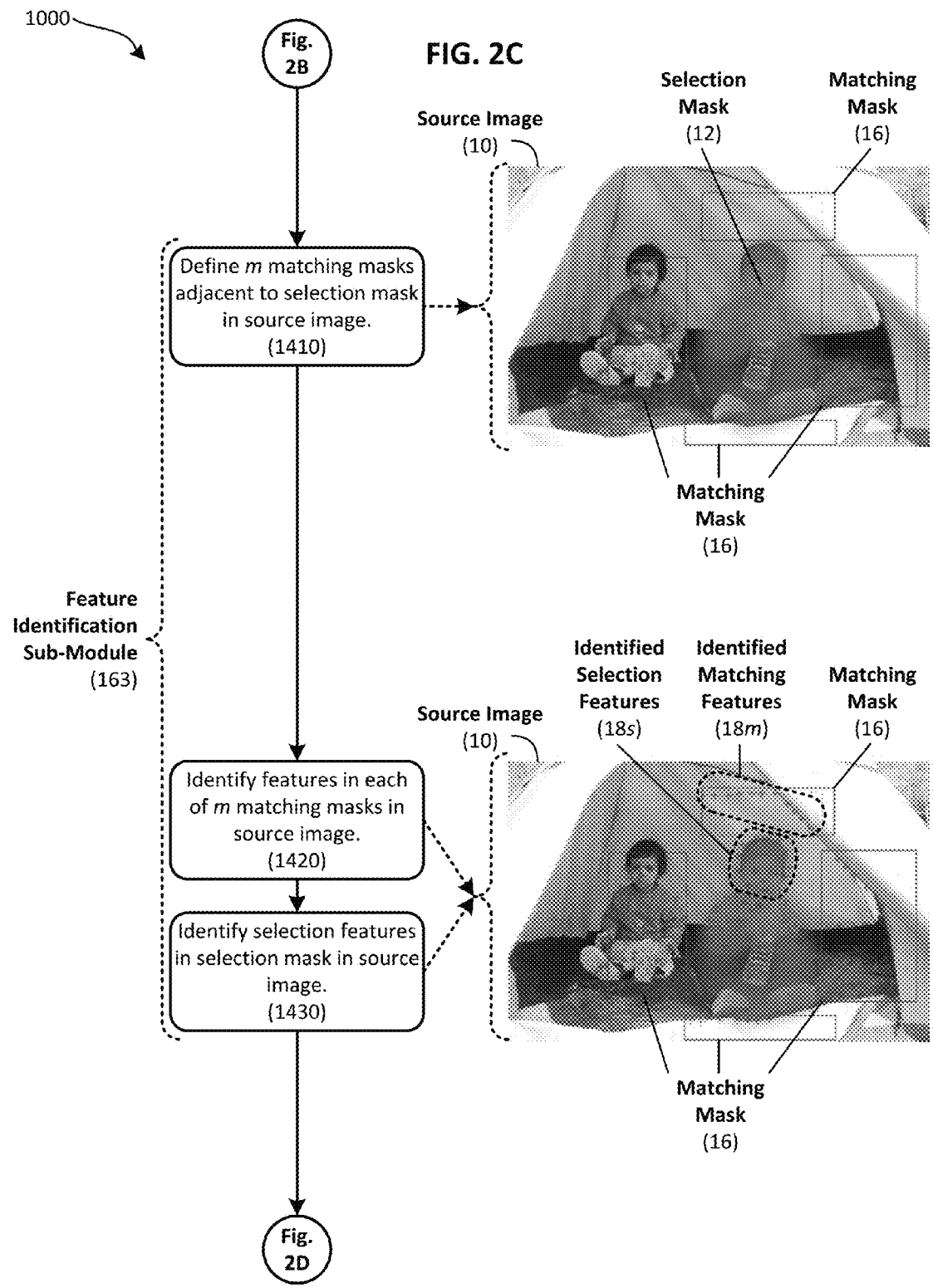

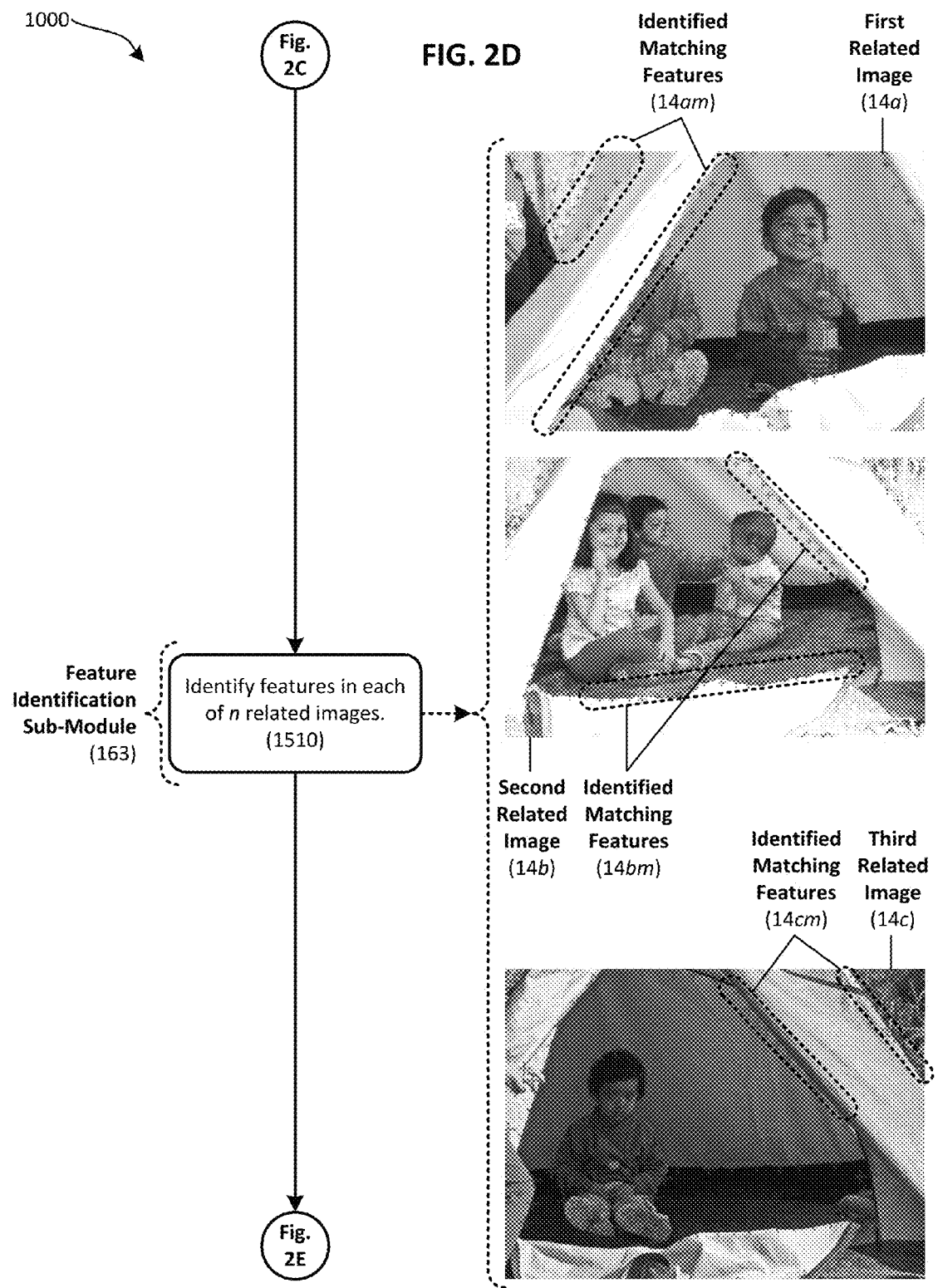

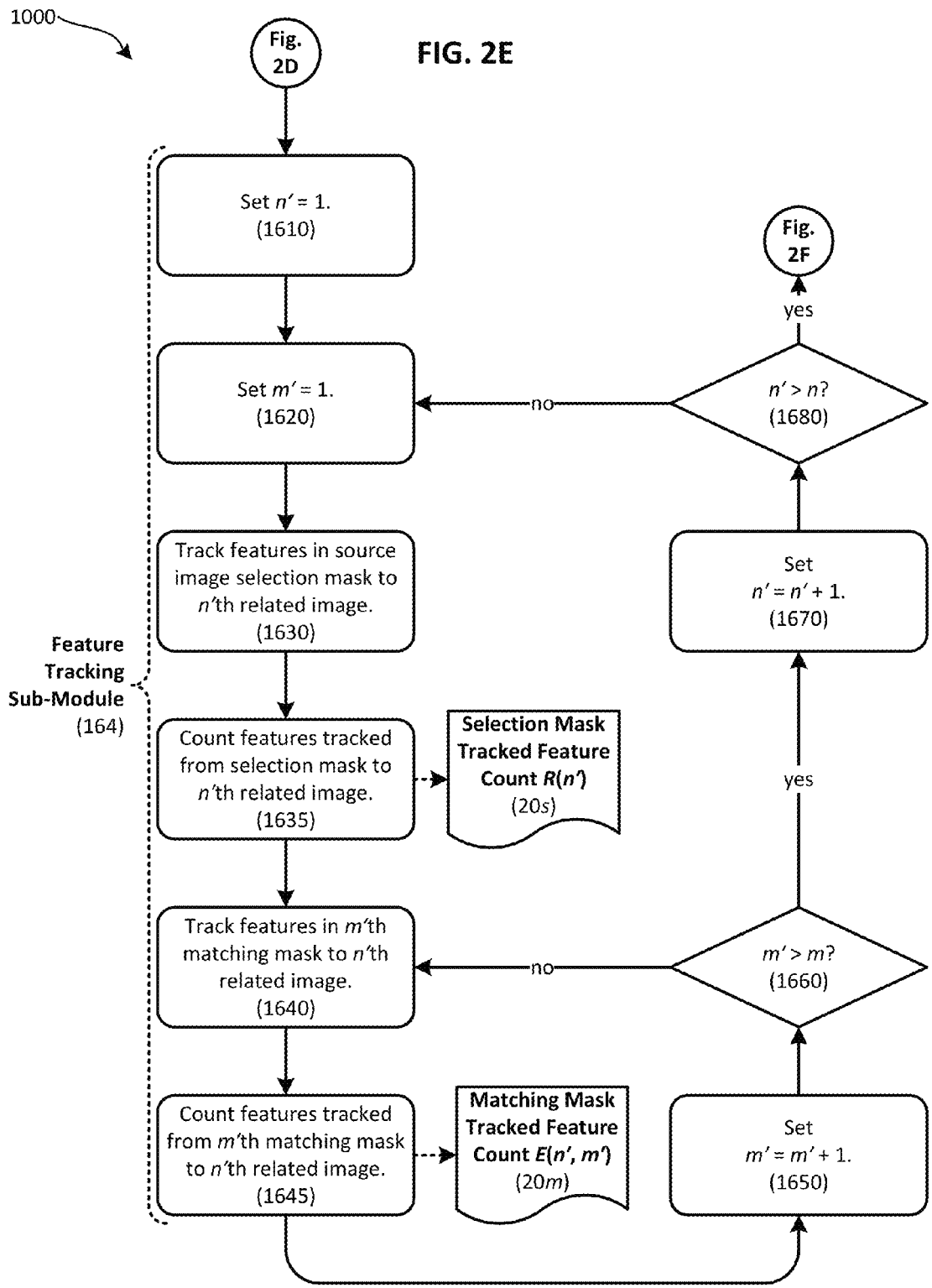

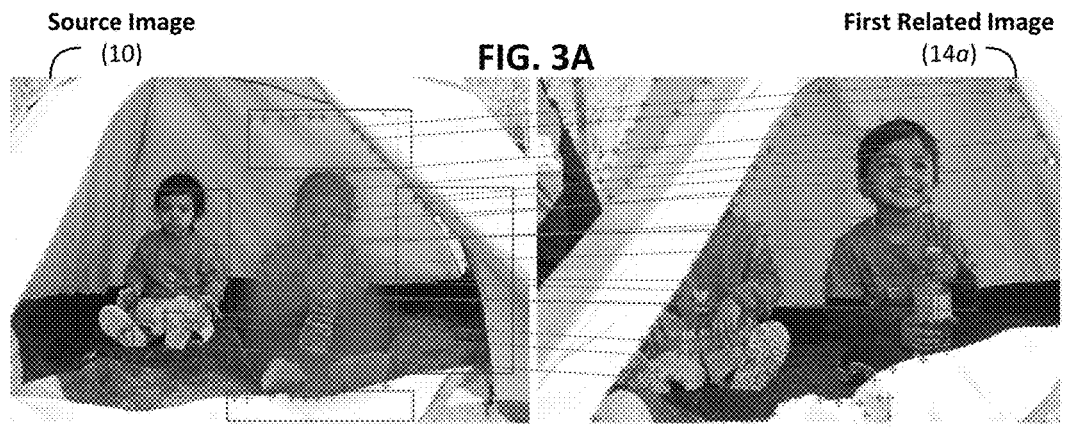
FIG. 3A — Source Image (10), First Related Image (14a)
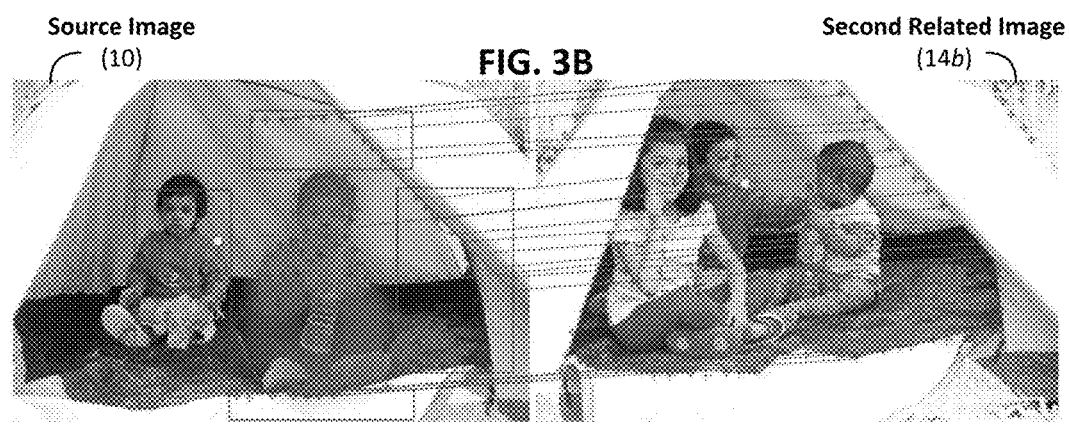
FIG. 3B — Source Image (10), Second Related Image (14b)
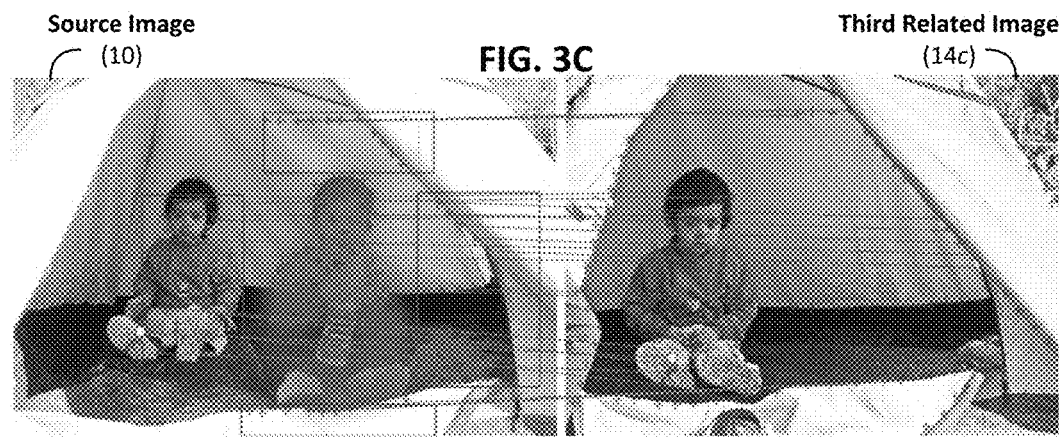
FIG. 3C — Source Image (10), Third Related Image (14c)

FIG. 4

| Related Image Index $n'$ | Matching Mask Index $m'$ | Selection Mask Tracked Feature Count $R(n')$ | Matching Mask Tracked Feature Count $E(n', m')$ | Matching Score $f(n') = \dfrac{1}{R(n')} \times \sum_{m'=1}^{m} E(n', m')$ |
|---|---|---|---|---|
| 1 | 1 (left) | 30 | 20 | 0.93 |
| | 2 (right) | | 0 | |
| | 3 (top) | | 3 | |
| | 4 (bottom) | | 5 | |
| 2 | 1 (left) | 1 | 8 | 44.00 |
| | 2 (right) | | 25 | |
| | 3 (top) | | 5 | |
| | 4 (bottom) | | 6 | |
| 3 | 1 (left) | 1 | 30 | 73.00 |
| | 2 (right) | | 25 | |
| | 3 (top) | | 10 | |
| | 4 (bottom) | | 8 | |

CONTENT AWARE FILL BASED ON SIMILAR IMAGES

FIELD OF THE DISCLOSURE

This disclosure relates generally to digital image processing, and more specifically to techniques for replacing a selected region of a source image with a background appearance that is derived from images that are similar to the source image.

BACKGROUND

A vacationer snaps a photograph of her friend lounging by the pool at their resort hotel. When the friends are looking through their photographs a few days later, they notice that a bystander strayed into the background of the scene when the picture was taken, thus spoiling the intended shot. They wish to remove the bystander from the photograph. The removal of an unwanted object appearing in a digital image is one example of an image manipulation operation that can be performed by a wide range of existing image editing software applications. Ideally, the unwanted object is replaced with a visually plausible background to produce a modified image that seems reasonable to the human eye. The particular algorithm used to remove the unwanted object is selected based on the size of the object to be removed from the source image and the appearance of the background scene. For example, texture synthesis algorithms, which seek to replicate a small sample texture source, work well when applied to fill large regions. Image "inpainting" algorithms, which fill holes in images by propagating linear structures into the target region via diffusion, work well in image restoration applications, such as to remove speckles, scratches, or overlaid text. Examples of existing image editing software applications that use algorithms such as these for object removal include Adobe Photoshop (Adobe Systems Incorporated, San Jose, Calif.), Corel Paint Shop Pro (Corel Corporation, Ottawa, Canada), and Autodesk SketchBook (Autodesk, Inc., San Rafael, Calif.).

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 2A through 2F comprise a flowchart illustrating an example image manipulation method for replacing a selected region of a source image with a background appearance that is derived from images that are similar to the source image.

FIG. 3A is a side-by-side comparison of features tracked from a source image to a first related image, as performed in an example embodiment of the image manipulation method disclosed herein.

FIG. 3B is a side-by-side comparison of features tracked from a source image to a second related image, as performed in an example embodiment of the image manipulation method disclosed herein.

FIG. 3C is a side-by-side comparison of features tracked from a source image to a third related image, as performed in an example embodiment of the image manipulation method disclosed herein.

FIG. 4 is a data structure correlating a particular related image with a matching score based on a selection mask tracked feature count and a matching mask tracked feature count.

DETAILED DESCRIPTION

Figure 1:
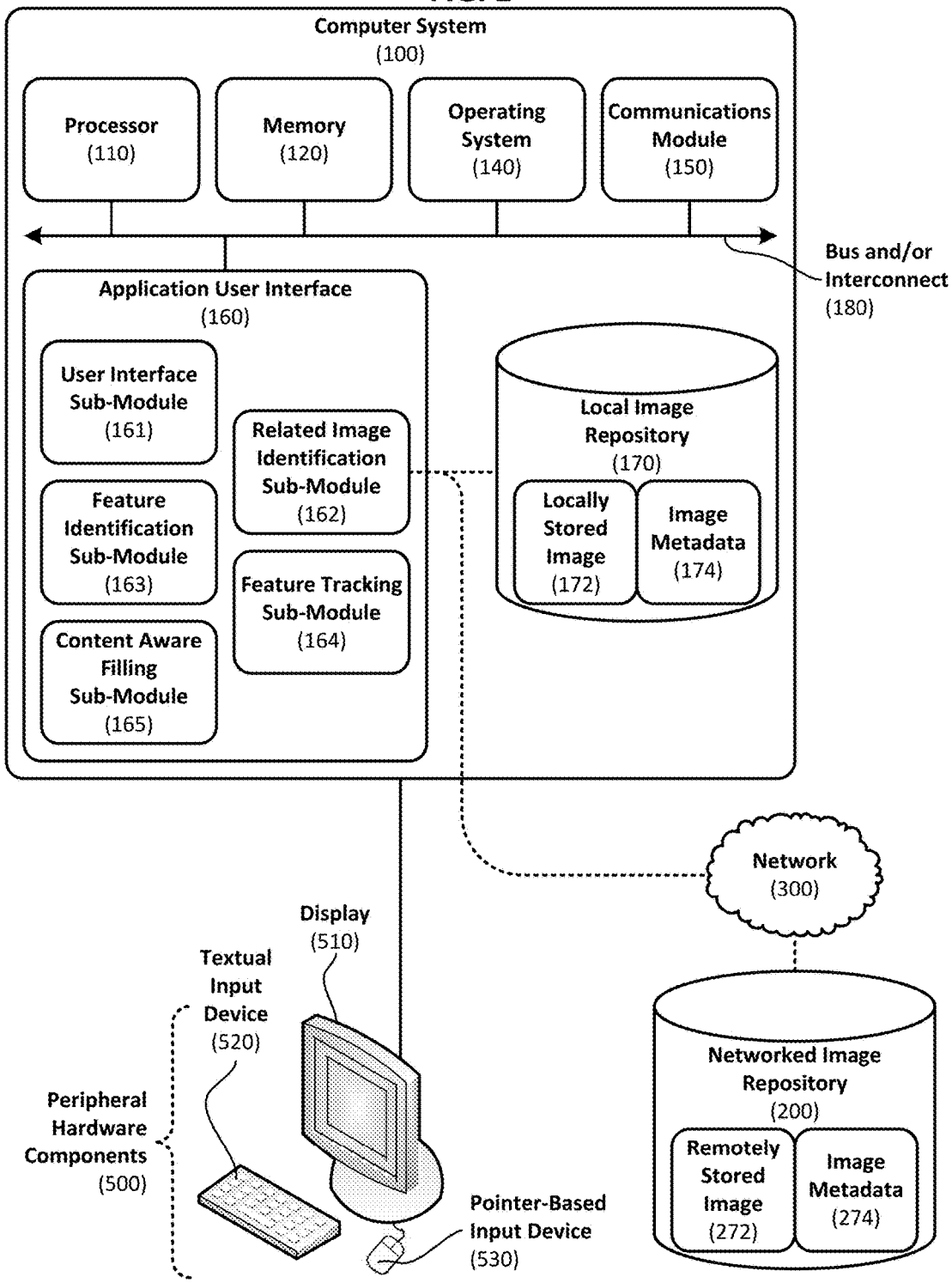
FIG. 1 is a block diagram schematically illustrating selected components of an example computer system that can be used to replace a selected region of a source image with a background appearance that is derived from images that are similar to the source image.

One of the more popular features associated with modern image editing software is a content aware fill tool that allows users to remove an unwanted object from a digital image. In general, the process of removing an unwanted object from a digital image involves defining a selection mask that identifies the object to be removed from the image, removing the pixels that form the unwanted object, and filling in the resulting hole with a visually plausible background. A number of selection tools exist that can be used to define a selection mask, including the "Magic Wand", "Quick Selection", and "Magnetic Lasso" tools which are available in Adobe Photoshop. Other selection tools use a localized level set algorithm for boundary detection (for example, as described in U.S. Patent Application Publication 2014/0258941 (published 11 Sep. 2014), or semantic input techniques that identify a selection area that corresponds to a textual input. Regardless of the particular tool used to define the selection mask, once the mask is defined removing the pixels within the mask is a relatively straightforward process. Filling in the resulting "hole" with a visually plausible background has proven to be somewhat more challenging.

Existing content aware filling algorithms analyze the area surrounding the region to be filled to define a fill pattern. These algorithms work well when the region is to be filled with a regular pattern that is relatively similar to the surrounding area in the image. But the results are decidedly unsatisfactory when the surrounding area is limited or contains patterns that do not correspond to that which should appear in the filled region. This is particularly problematic in applications where a large object is to be removed from an image, or where the removed object obscures an irregular background scene. Many times an existing content aware filling algorithm cannot find an appropriate background pattern, thus resulting in an unnatural or distorted image. In addition, existing content aware filling algorithms generally use randomly generated seed points to locate replacement patterns, thus causing such algorithms to produce different results when executed repeatedly with the same input. These shortcomings represent substantial limitations that make it difficult for users to remove unwanted objects from a digital image in a subtle and seamless manner.

Thus, and in accordance with certain of the embodiments disclosed herein, improved digital image processing techniques enable users to replace a selected region of a source image with a background appearance that is derived from images that are similar to the source image. For example, in one implementation a user identifies an unwanted object in a source image by defining a selection mask using any suitable existing selection tool or tools. A related image identification sub-module is configured to review a repository of potentially related images, such as might be contained in other albums owned or managed by the same user.

Related images are identified, for example, based on timestamp and/or geolocation metadata. One or more matching masks are identified in the source image, wherein each of the one or more matching masks are adjacent to the previously defined selection mask. A feature identification sub-module is configured to identify features in the selection and matching masks of the source image which also appear in one of the related images. The related image having a maximum of features which are tracked to a source image matching mask, but also a minimum of features which are tracked to the source image selection mask, is considered to be a best-match related image. By mapping the one or more source image matching masks onto the best-match related image, a seed region is located in the best-match related image. This seed region is used for filling in the source image. This allows the unwanted object to be replaced with a visually plausible background that has a reasonable appearance to the human eye. Numerous configurations and modifications will be apparent in light of this disclosure.

A number of advantages are associated with certain of the disclosed embodiments. For example, using a related image as the source for filling a background pattern produces significantly improved results where the background pattern cannot be derived from the source image itself. For example, where an unwanted object obscures a portion of a sign containing text, it could be impossible to derive the obscured text from only the source image containing the unwanted object. But where a related image is found in which the obscured text is visible, the related image provides a useful seed area which can form the basis for accurately filling in the obscured text in the source image. More generally, using a related image as the source for filling the background pattern provides an additional source of information beyond what is included in the source image itself. Use of only the source image in this regard is a significant limiting factor in the performance of existing content aware filling techniques. Thus certain of the disclosed embodiments are capable of producing visually plausible backgrounds even where the source image includes little (if any) area surrounding the filled region from which a pattern can be sampled. This is particularly useful where a large object to be removed from the source image. Finally, using a related image as the source for filling a background pattern reduces (or altogether eliminates) reliance on random sampling, thereby increasing the consistency of the filling technique in repeated applications. These improved results represent the value which can be derived from searching for features in images that are similar to the source image.

As used herein, the term "data structure" refers broadly, in addition to its ordinary meaning, to a way of storing and organizing data in a computer accessible memory so the data can be used by an application or software module. In its simplest form, a data structure can be, for example, a set of one or more memory locations. In some cases, a data structure may be implemented as a so-called record, sometimes referred to as a struct or tuple, and may have any appropriate number of fields, elements, or storage locations. As will be further appreciated, a data structure may include data of interest or a pointer that refers to a memory location where the data of interest can be found. A data structure may have any appropriate format such as, for example, a lookup table or index format; an array format; a hash table format; a graph, tree, or hierarchical format having a number of nodes; an object format that includes data fields, for instance similar to a record; or a combination of the foregoing. A data structure may include executable code for accessing and modifying the underlying structure and format of the data stored therein. In a more general sense, the data structure may be implemented as a data set that can store specific values without being constrained to any particular order or format. In one embodiment, a data structure comprises a table correlating a particular related image with a matching score based on a selection mask tracked feature count and a matching mask tracked feature count. Numerous other data structure formats and applications will be apparent in light of this disclosure.

System Architecture

FIG. 1 is a block diagram schematically illustrating selected components of an example computer system 100 that can be used to replace a selected region of a source image with a background appearance that is derived from images that are similar to the source image. Computer system 100 may comprise, for example, one or more devices selected from a desktop computer, a laptop computer, a workstation, a tablet computer, a smartphone, a handheld computer, a set-top box, an enterprise class server, or any other such computing device. A combination of different devices may be used in certain embodiments. In the illustrated embodiment, computer system 100 includes, among other things, a processor 110, a memory 120, an operating system 140, a communications module 150, an application user interface 160, and a local image repository 170. As can be further seen, a bus and/or interconnect 180 is also provided to allow for inter- and intra-device communications using, for example, communications module 150.

Depending on the particular type of device used for implementation, computer system 100 is optionally coupled to or otherwise implemented in conjunction with one or more peripheral hardware components 500. Examples of peripheral hardware components 500 include a display 510, a textual input device 520 (such as a keyboard), and a pointer-based input device 530 (such as a mouse). One or more other input/output devices, such as a touch sensitive display, a speaker, a printer, or a microphone, can be used in other embodiments. For example, in a particular alternative embodiment wherein computer system 100 is implemented in the form of a tablet computer, functionality associated with the particular peripheral hardware components 500 illustrated in FIG. 1 is provided instead by a touch sensitive surface that forms part of the tablet computer. In general, computer system 100 may be coupled to a network 300 to allow for communications with other computing devices or resources, such as a networked image repository 200. Other componentry and functionality not reflected in the schematic block diagram of FIG. 1 will be apparent in light of this disclosure, and thus it will be appreciated that other embodiments are not limited to any particular hardware configuration.

Processor 110 can be any suitable processor, and may include one or more coprocessors or controllers, such as an audio processor or a graphics processing unit, to assist in control and processing operations associated with computer system 100. Memory 120 can be implemented using any suitable type of digital storage, such as one or more of a disc drive, a universal serial bus (USB) drive, flash memory, and/or random access memory (RAM). Operating system 140 may comprise any suitable operating system, such as Google Android (Google Inc., Mountain View, Calif.), Microsoft Windows (Microsoft Corp., Redmond, Wash.), or Apple OS X (Apple Inc., Cupertino, Calif.). As will be appreciated in light of this disclosure, the techniques provided herein can be implemented without regard to the particular operating system provided in conjunction with computer system 100, and therefore may also be implemented using any suitable existing or subsequently-developed platform. Communications module 150 can be any appropriate network chip or chipset which allows for wired and/or wireless connection to other components of computer system 100, and/or to network 300, thereby enabling computer system 100 to communicate with other local and/or remote computer systems, servers, and/or resources.

Application user interface 160 is configured to provide a user interface that is capable of providing information to, and receiving information from, a user of computer system 100. The provided user interface can be implemented using, or otherwise used in conjunction with, peripheral hardware components 500. Application user interface 160 can be installed local to computer system 100, as shown in the example embodiment of FIG. 1. However, in alternative embodiments computer system 100 is implemented in a client-server arrangement wherein at least some portions of application user interface 160 are provided to computer system 100 using an applet (for example, a JavaScript applet) or other downloadable module. Such a remotely-provisioned module can be provided in real-time in response to a request from computer system 100 for access to a server having resources that are of interest to the user of computer system 100. Examples of such resources include a cloud-based repository of images or other content that the user wishes to manipulate. The server, if applicable, may be local to network 300 or may be remotely coupled to network 300 by one or more other networks or communication channels. In any such standalone or networked computing scenarios, application user interface 160 can be implemented with any suitable combination of technologies that allow a user to interact with computer system 100. In one particular example embodiment application user interface 160 is provided by an image editing software application such as Adobe Photoshop.

In certain embodiments application user interface 160 includes a user interface sub-module 161 configured to receive user input that identifies a source image and a repository containing images that are potentially related to the source image. User interface sub-module 161 can also be configured to provide one or more tools used to define a selection mask, such as the "Magic Wand", "Quick Selection", and "Magnetic Lasso" tools which are available in Adobe Photoshop. In addition to receiving such user input, user interface sub-module 161 can also be configured to display a modified image, such as a modified version of a source image wherein an unwanted object identified by the user-defined selection mask has been removed. Functionality associated with interface sub-module 161 can be implemented using any of a wide variety of suitable user interface elements, such as dialog boxes, control panels, display windows, pointer elements, menu bars, toolbars, dropdown menus, and context menus.

Still referring to the example embodiment illustrated in FIG. 1, application user interface 160 also includes a related image identification sub-module 162 configured to identify one or more images that are related to the source image. The related images can be identified based on a number of considerations, such as timestamp and/or geolocation metadata that is extracted from potentially related images. In an alternative implementation, related images are identified as such based solely on user input, such as user input designating all images within a particular album as being related.

Regardless of how the related images are identified, application user interface 160 also includes a feature identification sub-module 163 that is configured to define one or more matching masks adjacent to the user-defined selection mask in the source image. Feature identification sub-module 163 is also capable of identifying visual features in the source image as well as in related images identified by related image identification sub-module 162. The visual features identified in the source image fall within either (a) one of the one or more matching masks or (b) the selection mask. The selection mask corresponds to the location of the removal object. The matching masks correspond to regions that are adjacent to the selection mask, and that serve to match the source image with an appropriate related image. As used herein, the term "visual feature" (or "feature") refers, in addition to its ordinary meaning, to a visually identifiable element in a digital image, such as a line, boundary, point, or other distinguishing characteristic of the pixels that comprise the digital image. For example, a visible crease in a shirt, a line defined by adjoining color or pattern fields, and a person's eyebrow are all examples of features that may be found in a digital image. In one implementation feature identification sub-module 163 uses the Kanade-Lucas-Tomasi (KLT) technique for identifying features in the source and related images. Additional information regarding the KLT technique are provided in Tomasi, et al. "Detection and Tracking of Point Features", Carnegie Mellon University Technical Report CMU-CS-91-132 (April 1991).

In certain embodiments application user interface 160 also includes a feature tracking sub-module 164 configured to track features identified in the source image to one or more of the related images. In such embodiments feature tracking comprises making a determination whether a particular feature exists in both images, and if so, optionally establishing a relationship between the feature location in the source image and the feature location in the related image. This allows a position and/or perspective differential to be established between the two images in which the tracked feature appears. Feature tracking sub-module 164 can also be configured to count the number of tracked features, if any, within the selection mask as well as each of the one or more matching masks. These counts can be stored in a data structure that correlates a particular related image with a matching score that is derived from the feature counts.

In an example embodiment application user interface 160 further includes a content aware filling sub-module 165 configured to identify a best-match related image based on the aforementioned matching scores for each of the related images. In such embodiments content aware filling sub-module 165 is also configured to locate in the best match related image (a) one or more matching masks in the best-match related image and (b) a seed region that corresponds to the source image selection mask. For example, consider an implementation where the matching masks in the source image substantially encompass the user-defined selection mask. In this case, once the matching masks are mapped to the best match related image the matching masks in the best match related image will substantially encompass a seed region in the best match related image. Such a seed region corresponds to the source image selection mask. Once the seed region is located, the source image can be modified by replacing the region defined by the selection mask with an image derived from the seed region defined in the best-match related image. This allows the unwanted object to be replaced with a visually plausible background that has a reasonable appearance to the human eye.

Referring still to the example embodiment illustrated in FIG. 1, computer system 100 optionally includes local image repository 170 which comprises a plurality of locally stored images 172, as well as corresponding image metadata 174. For example in one embodiment local image repository 170 is implemented in the form of a USB drive, a memory card, or a disc drive. In alternative embodiments computer system 100 is additionally or alternatively in communication with networked image repository 200, which comprises a plurality of remotely stored images 272, as well as corresponding image metadata 274. In certain embodiments networked image repository 200 is implemented in the form of cloud storage. In embodiments wherein network 300 comprises a local network such as a Bluetooth or Wi-Fi connection between computer system 100 and an imaging device such as a digital camera or smartphone, networked image repository 200 comprises a memory resource provided by the imaging device itself. In some implementations related image identification sub-module 162 is configured to access both local and networked image repositories to identify images which are considered to be potentially related to a source image. It will be appreciated that, in general, the potentially related images stored in local and/or networked image repositories may not necessarily be associated with the same user who is associated with the source image or who is otherwise interacting with user interface sub-module 161.

The embodiments disclosed herein can be implemented in various forms of hardware, software, firmware, or special purpose processors. For example, in one embodiment a non-transitory computer readable medium has instructions encoded thereon that, when executed by one or more processors, cause one or more of the digital image manipulation methodologies disclosed herein to be implemented. The instructions can be encoded using one or more suitable programming languages, such as C, C++, object-oriented C, JavaScript, Visual Basic .NET, BASIC, or alternatively, using custom or proprietary instruction sets. Such instructions can be provided in the form of one or more computer software applications or applets that are tangibly embodied on a memory device, and that can be executed by a computer having any suitable architecture. In one embodiment the system can be hosted on a given website and implemented using JavaScript or another suitable browser-based technology.

The functionalities disclosed herein can optionally be incorporated into a variety of different software applications, such as image editing software applications, word processing applications, desktop publishing applications, and presentation applications. For example, a word processing application can be configured to manipulate digital images that are to be incorporated into a word processing document. The word processing application can therefore be configured to implement certain of the functionalities disclosed herein to facilitate such image manipulation. The computer software applications disclosed herein may include a number of different modules, sub-modules, or other components of distinct functionality, and can provide information to, or receive information from, still other components and services. These modules can be used, for example, to communicate with peripheral hardware components 500, networked storage resources such as networked image repository 200, or other external components. More generally, other components and functionality not reflected in the illustrations will be apparent in light of this disclosure, and it will be appreciated that the present disclosure is not intended to be limited to any particular hardware or software configuration. Thus in other embodiments the components illustrated in FIG. 1 many comprise additional, fewer, or alternative subcomponents.

The aforementioned non-transitory computer readable medium may be any suitable medium for storing digital information, such as a hard drive, a server, a flash memory, or random access memory. In alternative embodiments, the computer and modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input and output ports for receiving and transmitting data, respectively, and a number of embedded routines for carrying out the various functionalities disclosed herein. It will be apparent that any suitable combination of hardware, software, and firmware can be used, and that the present disclosure is not intended to be limited to any particular system architecture.

Methodology

FIGS. 2A through 2F comprise a flowchart illustrating an example image manipulation method 1000 for replacing a selected region of a source image with a background appearance that is derived from images that are similar to the source image. As can be seen, image manipulation method 1000 includes a number of phases and sub-processes, the sequence of which may vary from one embodiment to another. However, when considered in the aggregate, these phases and sub-processes form a complete image manipulation process that is responsive to user commands in accordance with certain of the embodiments disclosed herein. These methodologies can be implemented, for example, using the system architecture illustrated in FIG. 1. However other system architectures can be used in other embodiments, as will be apparent in light of this disclosure. To this end, the correlation of the various functionalities shown in FIGS. 2A through 2F to the specific components illustrated in FIG. 1 is not intended to imply any structural and/or use limitations. Rather other embodiments may include varying degrees of integration where multiple functionalities are performed by one system or by separate systems. For instance, in an alternative embodiment a single sub-module of application user interface 160 can be used to identify and track visual features. Thus other embodiments may have fewer or more modules and/or sub-modules depending on the granularity of implementation. Numerous variations and alternative configurations will be apparent in light of this disclosure.

Example image manipulation method 1000 commences with a user interacting with user interface sub-module 161 to identify a source image 10 that contains an unwanted object, also referred to herein as a "removal object" or an "object for removal". See reference numeral 1110 in FIG. 2A. For example, in one embodiment the user identifies source image 10 using a file browser graphical user interface that can be used to explore images stored in local image repository 170 and/or networked image repository 200. In another embodiment a user can invoke the functionality disclosed herein from within an image editing software application, wherein source image 10 is assumed to be an image that has already been opened using such application. Once the user identifies source image 10, the user can further interact with user interface sub-module 161 to define a selection mask 12 that identifies the removal object. See reference numeral 1120 in FIG. 2A. This can be accomplished using any of a variety of suitable selection tools, such as the "Magic Wand", "Quick Selection", or "Magnetic Lasso" tools which are available in Adobe Photoshop. In one embodiment the user draws a rough boundary around the removal object and the selection tool identifies a more precise boundary for selection mask 12 based on a suitable edge detection algorithm. In such embodiments user interface sub-module 161 is optionally configured to graphically display selection mask 12 using a visible boundary line or, as illustrated in FIG. 2A, a modified color. In other embodiments a selection mask is determined within the source image without regard to specific user input, but rather based on a detected condition and other input received as part of a overarching workflow.

Example image manipulation method 1000 may also commence with the user interacting with user interface sub-module 161 to identify a repository containing p images which are potentially related to source image 10, wherein p≥1. See reference numeral 1140 in FIG. 2A. Local image repository 170 and networked image repository 200 are examples of storage locations which can be identified as containing potentially related images. In embodiments wherein network 300 comprises a local network such as a Bluetooth or Wi-Fi connection between computer system 100 and an imaging device such as a digital camera, networked image repository 200 comprises a memory resource provided by the imaging device itself. Such embodiments are particularly useful where a user has used a smartphone, digital camera, or other mobile device to take several photographs of similar subjects, such as over the course of a vacation or an event. For example, where a user takes pictures at a wedding using his/her smartphone, the user may identify all of the images stored on the smartphone during the wedding as being potentially related. Additionally or alternatively, potentially related images can be acquired from a communal repository containing images that were not generated by the same user who generated the source image. This may be particularly advantageous where the source image is associated with a frequently photographed scene, such as a popular tourist attraction. As illustrated in FIG. 2A, it will be appreciated that identification of source image 10 and the potentially related images can be performed in any order, such that in some implementations the potentially related images are identified before, during, or after source image 10 is identified.

Once source image 10 and the p potentially related images are identified, related image identification sub-module 162 is configured to determine which of the p potentially related images are actually related to source image 10. In general, related images can be understood as having a relatively higher likelihood, as compared to the other potentially related images, of providing a background that is suitable for insertion into source image 10 in place of the removal object. For example, images taken at about the same time as source image 10, or in roughly the same location as source image 10, can be considered to be related images. Data that defines the time and location at which a digital image is acquired can often be extracted from metadata that is associated and stored with the digital image, such as image metadata 174, 274 illustrated in FIG. 1. Such metadata can be stored, for example, in the exchangeable image file (Exif) format.

Thus in one particular implementation related image identification sub-module 162 is configured to evaluate whether each of the p potentially related images should be considered to be actually related to source image 10. To facilitate sequential analysis of the p potentially related images, related image identification sub-module 162 compares the quantity p to a potentially related image counting parameter p' which is initially set such that p'=1. See reference numeral 1205 in FIG. 2B. It is then determined whether date/time data is available for the p'th potentially related image. See reference numeral 1210 in FIG. 2B. If such data is available, it can be used to determine whether the p'th potentially related image is related to source image 10. See reference numeral 1220 in FIG. 2B. For example, such a determination can be based on whether the p'th potentially related image was taken within a certain time of source image 10. Once this determination has been made, the potentially related image counting parameter p' is incremented such that p'=p'+1. See reference numeral 1260 in FIG. 2B. It is then determined whether all of the p potentially related images have been processed, that is, whether p'>p. See reference numeral 1270 in FIG. 2B. If not, the subsequent p'th image is processed in similar fashion.

If date/time data is unavailable for a particular p'th potentially related image, related image identification sub-module 162 can be configured to determine whether geolocation data is available for such image. See reference numeral 1230 in FIG. 2B. If such data is available, it can be used to determine whether the p'th potentially related image is related to source image 10. See reference numeral 1240 in FIG. 2B. For example, such a determination can be based on whether the p'th potentially related image was taken within a certain distance of the location whether source image 10 was taken. If neither date/time nor geolocation data is available for a particular p'th potentially related image, such image can be considered to be related to source image 10 by default. See reference numeral 1250 in FIG. 2B. Additional potentially related images can be processed as illustrated in FIG. 2B. Regardless of the particular criteria applied to determine whether the potentially related images are actually related to source image 10, the result of the method illustrated in FIG. 2B is the identification of n related images, n≥1. For example, of the twelve potentially related images illustrated in FIG. 2A, n=3 images are identified as being potentially related to source image 10. See first related image 14a, second related image 14b, and third related image 14c illustrated in FIG. 2B.

While the example implementation illustrated in FIG. 2B is configured such that date/time metadata is processed before geolocation data, in other implementations geolocation data is processed before date/time data. In still other implementations other types of metadata are used to determine whether a potentially related image is actually related to source image 10; example of such data include a camera device identifier associated with an image, a user identification associated with an image, or a compass orientation associated with an image. In some embodiments multiple data items must fall within specific ranges before an image is considered related. For example, it can be specified that both the date/time data and the geolocation data should fall within a certain range of data associated with source image 10. In still other embodiments no such requirements are specified, and all potentially related images identified by the user are considered to be related images by default, in which case p=n.

Once source image 10 is identified and selection mask 12 is defined, feature identification sub-module 163 is configured to define m matching masks 16 that are located adjacent to selection mask 12 in source image 10. See reference numeral 1410 in FIG. 2C. For instance, in the example embodiment illustrated in FIG. 2C, m=4 rectangular matching masks 16 are formed on the left, right, top, and bottom sides of selection mask 12. In other embodiments a different quantity m of matching masks can be used, a different shape of matching masks can be used, and/or a different positioning of matching masks can be used. For example, in one embodiment the quantity m of matching masks is fixed operator otherwise provisioned by default, while in an alternative embodiment a user-defined quantity m of selection masks is used. In one implementation the area of the matching masks 16 is fixed, while in other implementations the area varies depending on the area of selection mask 12 and/or the area of source image 10. Regardless of these variations, matching masks 16 provide context to features adjacent to selection mask 12 in source image 10, thereby facilitating the process of identifying a related image that includes similar features, and ultimately, that has a relatively higher likelihood of providing a background that is suitable for insertion into source image 10 in place of the removal object. Thus in one embodiment the m matching masks are configured to substantially encompass the user defined selection area.

Feature identification sub-module 163 is configured to identify features in source image 10 as well as in each of the n related images. More specifically, feature identification sub-module 163 is configured to identify matching features 18m in one or more of the m matching masks 16 that are defined in source image 10. See reference numeral 1420 in FIG. 2C. Feature identification sub-module 163 is also configured to identify selection features 18s in selection mask 12. See reference numeral 1430 in FIG. 2C. Thus each of the features identified in source image 10 is associated with either selection mask 12 or one of the m matching masks 16. In one embodiment coordinates associated with each of the identified features 18m, 18s are optionally stored in a data structure that correlates a particular matching mask 16 or selection mask 12 with a set of coordinates that define features identified within such mask. Feature identification sub-module 163 is also configured to identify features in each of the n related images. See reference numeral 1510 in FIG. 2D. In particular, FIG. 2D illustrates that first, second, and third sets of identified matching features 14am, 14bm, 14cm are identified in corresponding first, second, and third related images 14a, 14b, 14c, respectively. Unlike the features identified in source image 10, the features identified in the n related images are not initially associated with any matching or selection mask. In one particular implementation, feature identification sub-module 163 uses the KLT technique for identifying features. In the example images illustrated in FIGS. 2C and 2D, such features are visually identified with a + symbol. Thus, for instance, an outline of a child's body, a crease or seam in the fabric of a tent, or a background edge are visually marked as features that are denoted by a set of + symbols. While the identified features are visually marked in FIGS. 2C and 2D for purposes of illustration, in general such marking is optional, and indeed in many implementations will be substantially or entirely transparent to the user.

Once features are identified in source image 10 and the n related images, feature tracking sub-module 164 is configured to track such features between source image 10 and each of the n related images. To facilitate sequential analysis of the n related images, feature tracking sub-module 164 compares the quantity n to a related image counting parameter n' which is initially set such that n'=1. See reference numeral 1610 in FIG. 2E. Likewise, to facilitate sequential analysis of the m matching masks in each of the n related images, feature tracking sub-module 164 compares the quantity m to a matching mask counting parameter m' which is initially set such that m'=1. See reference numeral 1620 in FIG. 2E.

After the counting parameters are initialized, feature tracking sub-module 164 is configured to track features identified in the source image selection mask 12 to the n'th related image. See reference numeral 1630 in FIG. 2E. The process of tracking a feature between two images comprises making a determination whether the same feature exists in both images. This can be accomplished, for example, by comparing visual characteristics of a subset of one or more features such as relative positioning, hue, brightness, saturation, and/or luminosity. Other characteristics can be compared in other embodiments. Feature tracking optionally comprises establishing a relationship between a feature location in source image 10 and a corresponding feature location in one of the n related images, thereby allowing a position and/or perspective differential to be established between the two images.

The number of features which were able to be tracked from the source image selection mask 12 to the n'th related image are counted. See reference numeral 1635 in FIG. 2E. The result is a selection mask tracked feature count for the n'th related image 20s, which is referred to herein as R(n'). Feature tracking sub-module 164 is also configured to track features in the m'th matching mask of source image 10 to the n'th related image. See reference numeral 1640 in FIG. 2E. The number of features which were able to be tracked from the m'th source image matching mask to the n'th related image can be counted as well. See reference numeral 1645 in FIG. 2E. The result is an m'th matching mask tracked feature count for the n'th related image 20m, which is referred to herein as E(n', m'). In some implementations a minimum threshold quantity of tracked features $E_{th}$ must be identified before the image manipulation technique can be completed, such that $$\sum_{n'=1}^{n} \sum_{m'=1}^{n} E(n', m') > E_{th}. \qquad (1)$$

In particular, if the quantity of tracked features does not exceed $E_{th}$, it can be assumed that the related images are not sufficiently similar to source image 10 to allow such related images to serve as a basis for filling in selection mask 12.

Once the features in the m'th matching mask have been tracked to the n'th related image, and once such tracked features have been counted so as to define E(n', m'), the matching mask counting parameter m' is incremented such that m'=m'+1. See reference numeral 1650 in FIG. 2E. It is then determined whether all of the m matching masks have been similarly processed, that is, whether m'>m. See reference numeral 1660 in FIG. 2E. If not, features in the subsequent m'th masking mask are processed in similar fashion. If all of the m matching masks have been processed for the n'th related image (that is, if m'>m), the related image counting parameter n' is incremented such that n'=n'+1. See reference numeral 1670 in FIG. 2E. It is then determined whether all of the n related images have been similarly processed, that is, whether n'>n. See reference numeral 1680 in FIG. 2E. If not, the subsequent n'th related image is processed in similar fashion. If all of the n related images have been processed (that is, if n'>n), content aware filling sub-module 165 can be configured to identify a best-match related image and modify source image 10, as will be described in turn.

Figure 2F:
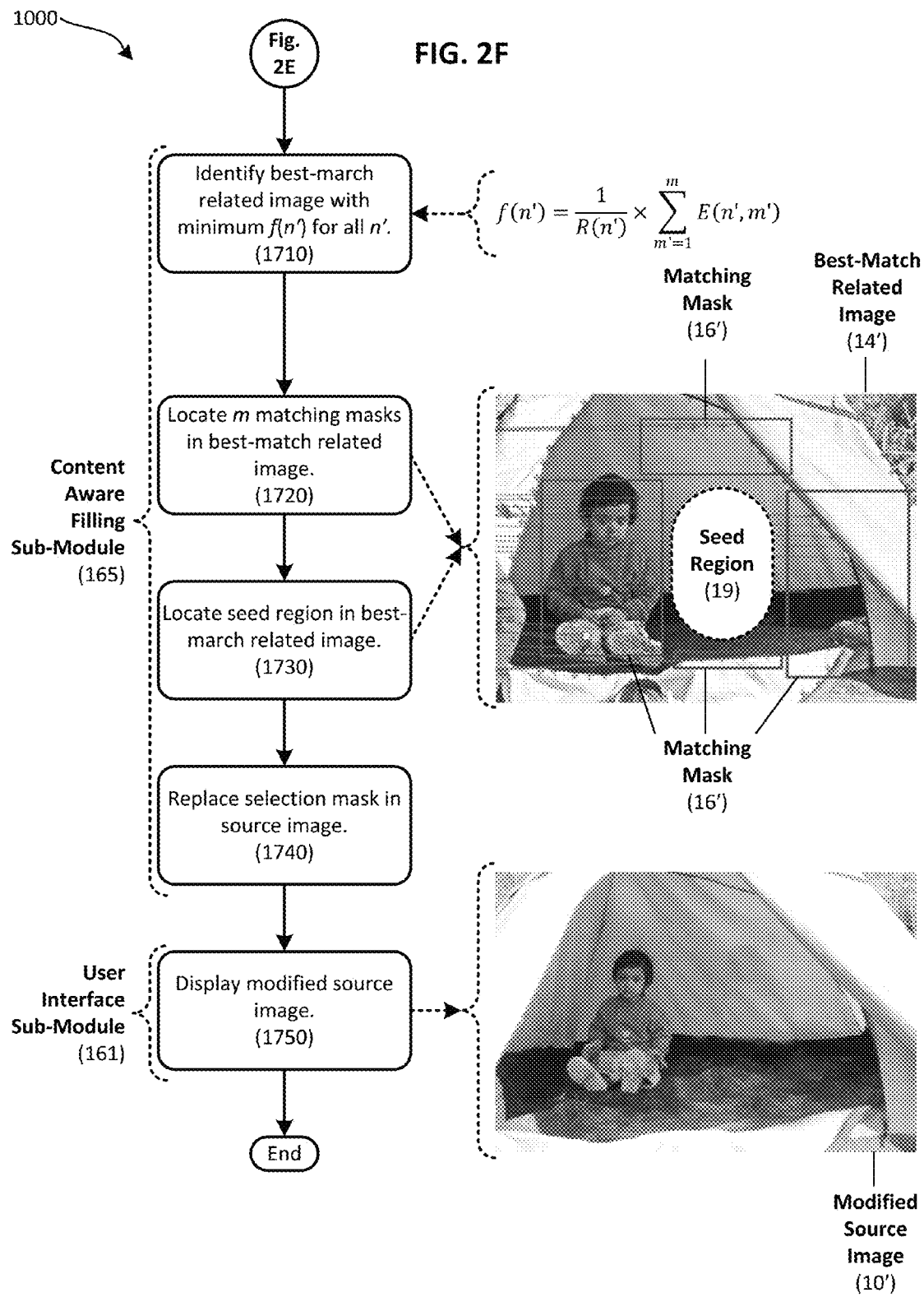

As illustrated in FIG. 2F, content aware filling sub-module 165 is configured to use the selection mask tracked feature counts R(n') and the matching mask tracked feature counts E(n', m') to identify a best-match related image 14'.

In general, best-match related image 14' can be understood as a related image having both (a) a relatively large number of features tracked from the m matching masks in source image 10, and (b) a relatively small number of features tracked from the selection mask 12 in source image 10. This combination corresponds to a related image that contains many of the characteristics of source image 10, but that does not contain the removal object. To facilitate identification of best-match related image 14', a matching score f(n') can be calculated for each of the n related images. In one embodiment matching score f(n') is defined such that $$f(n') = \frac{1}{R(n')} \times \sum_{m'=1}^{m} E(n', m'). \quad (2)$$

Other definitions for matching score f(n') can be used in other embodiments. The related image with the maximum matching score f(n') can be considered to be best-match related image 14'. Thus content aware filling sub-module 165 can be configured to identify best-match related image 14' having the maximum matching score AO for all n'=1, 2, 3, . . . , n. See reference numeral 1710 in FIG. 2F. In certain implementations selection mask tracked feature count is provided with a minimum value R(n')=1 even where no features were tracked from selection mask 12.

For example, FIG. 3A is a side-by-side comparison of features tracked from source image 10 to first related image 14a. Because two children appear in both source image 10 and first related image 14a, a relatively large number of features were able to be tracked from selection mask 12 to first related image 14a, and therefore the selection mask tracked feature count R(n'=1) is relatively large. On the other hand, relatively few features were able to be tracked from the right, top, and bottom (m'=2, 3, 4) matching masks in source image 10 to first related image 14a, and therefore the matching mask tracked feature counts E(n'=1, m'=2, 3, 4) are relatively small. The exact values for these features counts are illustrated in FIG. 4, which comprises a data structure correlating a particular related image n' with a matching score f(n') based on a selection mask tracked feature count R(n') and a matching mask tracked feature count E(n', m'). First related image 14a corresponds to a matching score f(n'=1)=0.93, which indicates that first related image 14a would be a relatively poor source for a background that is suitable for insertion into source image 10 in place of the removal object.

FIG. 3B is a side-by-side comparison of features tracked from source image 10 to second related image 14b. And FIG. 3C is a side-by-side comparison of features traced from source image 10 to third related image 14c. Likewise, FIG. 4 also lists tracked feature counts R(n') and E(n', m') and corresponding matching scores f(n') for the second and third related images 14b, 14c as well. A comparison of these values reveals that third related image 14c has the maximum matching score f(n'), and therefore can be considered to be best-match related image 14'. In particular, it can be noted that third related image 14c has a similar perspective and background as source image 10 (which results in relatively high matching mask tracked feature counts E(n'=3, m'=1, 2, 3, 4)), but does not include a second child (which results in a relatively low selection mask tracked feature count R(n'=3)). Third related image 14c is therefore considered to be a preferred source for a background that is suitable for insertion into source image 10 in place of the removal object.

Once best-match related image 14' is identified, content aware filling sub-module 165 is configured to locate m matching masks 16' in best-match related image 14'. See reference numeral 1720 in FIG. 2F. In one embodiment, the location of the m matching masks 16' in best-match related image 14' is based on a position and/or perspective differential that exists in comparison to source image 10, such as previously established by feature tracking sub-module 164. For example, a particular matching mask 16' can be defined as a rectangular frame that encompasses certain tracked features that exist in a corresponding matching mask 16 in source image 10. Thus it will be appreciated that a source image matching mask 16 may not necessarily have the same size and position as a corresponding related image matching mask 16'. Given the locations of the m matching masks 16' in the best-match related image 14', content aware filling sub-module 165 locates a seed region 19 in a region of best-match related image 14' that is surrounding by the m matching masks 16'. See reference numeral 1730 in FIG. 2F. Selection mask 12 in source image 10 can then be replaced using any suitable content aware filling algorithm that takes seed region 19 as an input seeding pattern. See reference numeral 1740 in FIG. 2F. This produces a modified source image 10' from which the removal object has been excluded. User interface sub-module 161 can be configured to display modified source image 10'. See reference numeral 1750 in FIG. 2F.

CONCLUSION

Figure 5A:
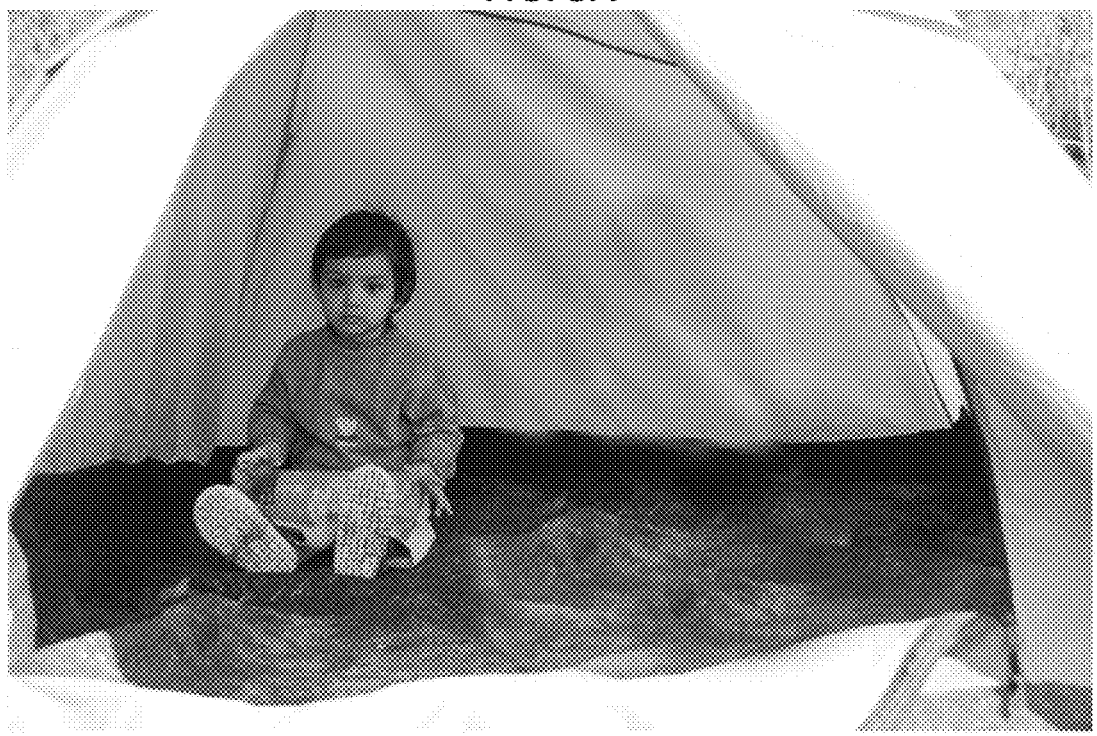
FIG. 5A is a modified source image generated using an example embodiment of the methods disclosed herein.
Figure 5B:
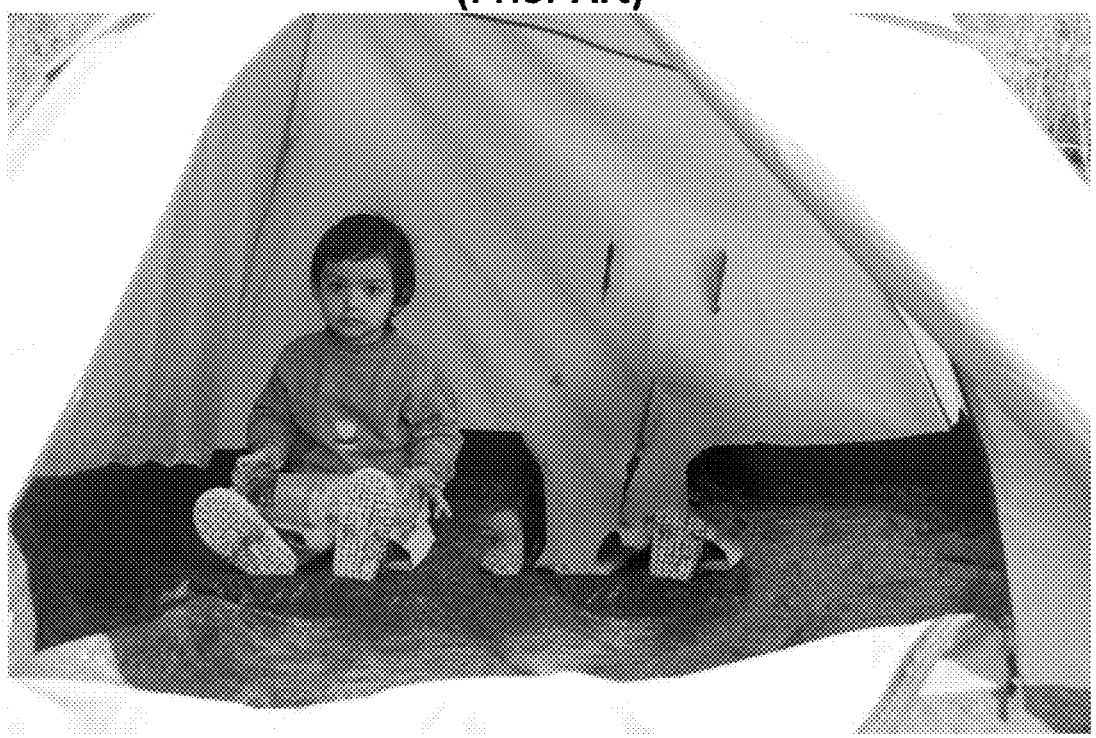
FIG. 5B is a modified source image generated using an existing content aware filling technique.

As disclosed herein, techniques for replacing a selected region of a source image with a background appearance that is derived from images that are similar to the source image produce substantially improved results as compared to existing techniques. For example, FIG. 5A illustrates modified source image 10' generated using the example embodiment illustrated in FIGS. 2A through 2F and described herein. FIG. 5B, on the other hand, illustrates a modified source image generated using an existing content aware filing technique that generates a background fill pattern based on patterns derived from the source image itself. As can be seen, the methods disclosed herein produce a substantially more visually plausible image that seems reasonable to the human eye, and in particular, that does not have a distorted appearance that has obviously been manipulated. This reduces the likelihood that further image manipulation is required to produce an image with a realistic appearance. Certain of the techniques disclosed herein also generate fewer heuristic errors as well. The various embodiments disclosed herein produce improved results by virtue of the fact that background information can be derived from multiple images. This is particularly useful in applications where specific content should be filled in behind the removal object, and in particular, where such specific content cannot be derived from areas adjacent to the removal object. For example, where the removal object obscures a sign containing text, the obscured text generally cannot be derived from the source image itself, but rather should be derived from other related images.

Numerous variations and configurations will be apparent in light of this disclosure. For instance one example embodiment provides a digital image processing method that comprises receiving a source image. The method further comprises determining a selection mask within the source image. The selection mask comprises an object for removal that appears in the source image. The method further comprises identifying a plurality of images that are related to the source image. The method further comprises selecting one of the plurality of related images as a best-match related image. The method further comprises removing a portion of the source image that is defined by the selection mask. The method further comprises filling in the removed portion of the source image using a segment of the best-match related image. In some cases the method further comprises displaying a modified source image that does not include the object for removal. In some cases a content aware filling algorithm is used to insert the segment of the best-match related image into the source image. In some cases plurality of related images are reposed in one or more of a local image repository and a networked image repository. In some cases the method further comprises (a) defining a plurality of matching masks in the source image, wherein each of the plurality of matching masks is positioned adjacent to the selection mask; (b) identifying matching features in the matching masks; (c) identifying selection features in the selection mask; (d) identifying features in a first one of the plurality of related images; (e) tracking a plurality of features from the source image to the first related image; (f) determining a selection mask tracked feature count R(n') corresponding to a quantity of features tracked from the selection mask to the first related image; (g) determining a matching mask tracked feature count E(n', m') corresponding to a quantity of features tracked from the matching masks to the first related image; and (h) determining a matching score f(n') based on a ratio of the matching mask tracked feature count to the selection mask tracked feature count, wherein the best-match related image corresponds to a related image having a maximum matching score. In some cases identifying the plurality of related images further comprises (a) receiving user input identifying an album containing a plurality of potentially related images, wherein each of the potentially related images is associated with image metadata; and (b) analyzing the image metadata associated with each of the potentially related images, wherein the plurality of related images are identified on based on the image metadata. In some cases identifying the plurality of related images further comprises (a) determining a first location associated with the source image; (b) determining a second location associated with a potentially related image; and (c) identifying the potentially related image as one of the plurality of related images if the first and second locations are separated by a distance that is less than a threshold distance. In some cases identifying the plurality of related images further comprises (a) determining a first timestamp associated with the source image; (b) determining a second timestamp associated with a potentially related image; and (c) identifying the potentially related image as one of the plurality of related images if the first and second timestamps are separated by a time interval that is less than a threshold time interval.

Another example embodiment provides a digital image processing system that comprises a user interface module configured to receive user input that defines a selection mask in a source image. The selection mask corresponds to a removal object that appears in the source image. The system further comprises a related image identification module configured to identify a plurality of images that are related to the source image. The system further comprises a feature tracking module configured to track one or more features appearing in the source image with features appearing in the related images. The feature tracking module is further configured to select one of the related images as a best-match related image based on a matching score that is derived from a quantity of features that are tracked between the source image and the best-match related image. The system further comprises a content aware filling module configured to replace a portion of the source image that is defined by the selection mask with a background pattern that is derived from a segment of the best-match related image. In some cases the best-match related image is associated with a maximum matching score from amongst matching scores associated with the plurality of related images. In some cases the user interface module is further configured to display a modified source image that does not include the removal object. In some cases the system further comprises a feature identification module that identifies one or more features appearing in the source image and the features appearing in the related images using a Kanade-Lucas-Tomasi technique. In some cases the system further comprises a feature identification module that defines a plurality of matching masks in the source image, wherein (a) each of the matching masks are positioned adjacent to the selection mask; (b) the feature tracking module is further configured to determine (i) a selection mask tracked feature count R(n') corresponding to a quantity of features tracked from the selection mask to a first one of the plurality of related images and (ii) a matching mask tracked feature count E(n', m') corresponding to a quantity of features tracked from the matching masks to the first related image; and (c) the matching score is based on a ratio of the matching mask tracked feature count to the selection mask tracked feature count. In some cases the user interface module is further configured to receive supplemental user input that identifies a plurality of potentially related images, wherein the plurality of related image consist of a subset of the potentially related images. In some cases the user interface module is further configured to receive supplemental user input that identifies the related images, such that the related image identification module operates in response to the supplemental user input. In some cases (a) the user interface module is further configured to receive supplemental user input that identifies a plurality of potentially related images, wherein the plurality of related image consist of a subset of the potentially related images; and (b) the related image identification module is further configured to identify the related images based on analysis of metadata associated with each of the plurality of potentially related images.

Another example embodiment provides a computer program product encoded with instructions that, when executed by one or more processors, causes a digital image manipulation process to be carried out. The process comprises receiving a source image. The process further comprises receiving user input that defines a selection mask within the source image. The selection mask corresponds to a removal object that appears in the source image. The process further comprises identifying a plurality of images that are related to the source image. The process further comprises selecting one of the plurality of related images as a best-match related image. The process further comprises removing a portion of the source image that is defined by the selection mask. The process further comprises filling in the removed portion of the source image using a segment of the best-match related image as a seeding pattern. In some cases the process further comprises (a) defining a plurality of matching masks in the source image, wherein each of the plurality of matching masks is a rectangular area positioned adjacent to the selection mask; (b) identifying matching features in the matching masks; (c) identifying features in each of the plurality of related images; (d) determining a quantity of features that can be tracked from the source image matching masks to the plurality of related images; and (e) comparing the quantity of tracked features to a threshold tracked feature count $E_{th}$. In some cases the process further comprises (a) defining m matching masks in the source image, wherein each of the m matching masks is a rectangular area positioned adjacent to the selection mask; (b) identifying matching features in the m matching masks; (c) identifying selection features in the selection mask; (d) identifying features in a first one of the plurality of related images; (e) tracking a plurality of identified features from the source image to the first related image; (f) determining a selection mask tracked feature count R(n') corresponding to a quantity of features tracked from the selection mask to the first related image; (g) determining a matching mask tracked feature count E(n', m') corresponding to a quantity of features tracked from the m matching masks to the first related image; and (h) determining a matching score f(n') defined by Equation (2), wherein the best-match related image corresponds to a related image having a maximum matching score f(n'). In some cases the process further comprises (a) defining a first plurality of matching masks in the source image, wherein each of the first plurality of matching masks is positioned adjacent to the selection mask; (b) identifying matching features in the first plurality of matching masks; (c) identifying selection features in the selection mask; (d) identifying features in a first one of the plurality of related images; (e) tracking a plurality of identified features from the source image to the first related image; (f) identifying the first related image as the best-match related image; (g) defining a second plurality of matching masks in the best-match related image; and (h) defining the segment of the best-match related image based on an area adjacent to each of the second plurality of matching masks in the first best-match related image.

The foregoing description has been presented for the purposes of illustration and description. It is not intended to be exhaustive or to limit the invention to the particular disclosed embodiments. Many modifications and variations are possible in light of this disclosure. Thus it is intended that the scope of the invention be limited not by this detailed description, but rather by the claims appended hereto.

What is claimed is:

1. A digital image processing method that comprises:
receiving a source image comprising a plurality of visual features;
defining a selection mask within the source image, the selection mask comprising a removal object that appears in the source image and that comprises a plurality of selection features which are a first subset of the visual features;
defining m matching masks within the source image, each of which comprise an area positioned adjacent to the selection mask, wherein the m matching masks collectively comprise a plurality of matching features which are a second subset of the visual features;
identifying n images that are related to the source image;
tracking visual features from the source image to at least one of the n related images;
determining a selection mask tracked feature count R(n') corresponding to a quantity of features tracked from the selection mask to an n'th related image;
determining a matching mask tracked feature count E(n', m') corresponding to a quantity of features tracked from an m'th matching mask to the n'th related image;
selecting one of the n related images as a best-match related image based on a matching score that depends on E(n', m') and R(n');
removing a portion of the source image that is included in the selection mask; and
filling in the removed portion of the source image using a segment of the best-match related image.

2. The method of claim 1, further comprising causing display of a modified source image that does not include the removal object.

3. The method of claim 1, wherein a content aware filling algorithm is used to insert the segment of the best-match related image into the source image.

4. The method of claim 1, wherein the n related images are reposed in one or more of a local image repository and a networked image repository.

5. The method of claim 1, further comprising:
determining a total matching mask tracked feature count corresponding to a total quantity of features tracked from the m matching masks to the n'th related image, wherein the matching score is proportional to a ratio of the total matching mask tracked feature count to the selection mask tracked feature count R(n').

6. The method of claim 1, wherein identifying the n related images further comprises:
receiving user input identifying an album containing an initial plurality of images, each of which is associated with image metadata; and
analyzing the image metadata associated with each of the initial plurality of images, wherein the n related images are identified on based on the image metadata.

7. The method of claim 1, wherein identifying the n related images further comprises:
determining a first location associated with the source image;
determining a second location associated with a second image; and
identifying the second image as one of the n related images if the first and second locations are separated by a distance that is less than a threshold distance.

8. The method of claim 1, wherein identifying the n related images further comprises:
determining a first timestamp associated with the source image;
determining a second timestamp associated with a second image; and
identifying the second image as one of the n related images if the first and second timestamps are separated by a time interval that is less than a threshold time interval.

9. A digital image processing system that comprises:
a user interface module configured to receive user input that defines a selection mask in a source image, wherein the selection mask corresponds to a removal object that appears in the source image;
a related image identification module configured to identify n images that are related to the source image;
a feature identification module that defines m matching masks in the source image, each of which is positioned adjacent to the selection mask;
a feature tracking module configured to (a) track one or more features appearing in the source image with features appearing in at least one of the n related images, (b) determine a selection mask tracked feature count R(n') corresponding to a quantity of features tracked from the selection mask to an n'th related image, (c) determine a matching mask tracked feature count E(n', m') corresponding to a quantity of features tracked from an m'th matching mask to the n'th related image, and (d) select one of the n related images as a best-match related image based on a matching score that is derived from a quantity of features that are tracked between the source image and the best-match related image; and a content aware filling module configured to replace a portion of the source image that is included in the selection mask with a background pattern that is derived from a segment of the best-match related image, wherein the matching score depends on the matching mask tracked feature count and the selection mask tracked feature count.

10. The system of claim 9, wherein the best-match related image is associated with a maximum matching score from amongst matching scores associated with the n related images.

11. The system of claim 9, wherein the user interface module is further configured to display a modified source image that does not include the removal object.

12. The system of claim 9, wherein the feature identification module defines a particular matching mask as including a particular feature that is identified using a Kanade-Lucas-Tomasi technique.

13. The system of claim 9, wherein:
the feature tracking module is further configured to determine a total matching mask tracked feature count corresponding to a total quantity of features tracked from the m matching masks to the n'th related image; and
the matching score is proportional to a ratio of the total matching mask tracked feature count to the selection mask tracked feature count.

14. The system of claim 9, wherein the user interface module is further configured to receive supplemental user input that identifies an image repository, wherein the the n related images consist of images stored in the image repository.

15. The system of claim 9, wherein the user interface module is further configured to receive supplemental user input that identifies the n related images, such that the related image identification module operates in response to the supplemental user input.

16. The system of claim 9, wherein:
the user interface module is further configured to receive supplemental user input that identifies an image repository;
wherein the n related images consist of images stored in the image repository; and
the related image identification module is further configured to identify the n related images based on analysis of metadata associated with images stored in the image repository.

17. A non-transitory computer readable medium encoded with instructions that, when executed by one or more processors, causes a digital image manipulation process to be carried out, the process comprising:
receiving a source image comprising a plurality of visual features;
receiving user input that defines a selection mask within the source image, wherein the selection mask corresponds to a removal object that appears in the source image and that comprises a plurality of selection features which are a first subset of the visual features;
defining m matching masks within the source image, each of which comprise an area positioned adjacent to the selection mask, wherein the m matching masks collectively comprise a plurality of matching features which are a second subset of the visual features;
identifying n images that are related to the source image;
tracking visual features from the source image to at least one of the n related images;
determining a selection mask tracked feature count R(n') corresponding to a quantity of features tracked form the selection mask to an n'th related image;
determining a matching mask tracked feature count E(n', m') corresponding to a quantity of features tracked from an m'th matching mask to the n'th related image;
selecting one of the n related images as a best-match related image based on a matching score f(n') that depends on E(n', m') and R(n');
removing a portion of the source image that is within the selection mask; and
filling in the removed portion of the source image using a segment of the best-match related image as a seeding pattern.

18. The non-transitory computer readable medium of claim 17:
wherein each of the m matching masks is a rectangular area positioned adjacent to the selection mask; and
wherein the digital image manipulation process further comprises (a) determining a total matching mask tracked feature count corresponding to a total quantity of features tracked from the m matching masks to the n'th related image, and (b) comparing the total matching mask tracked feature count to a threshold tracked feature count $E_{th}$.

19. The non-transitory computer readable medium of claim 17, wherein the digital image manipulation process further comprises determining a total matching mask tracked feature count corresponding to a total quantity of features tracked from the m matching masks to the n'th related image, wherein the matching score f(n') is given by $$f(n') = \frac{1}{R(n')} \times \sum_{m'=1}^{m} E(n', m'),$$

and wherein the best-match related image corresponds to a related image having a maximum matching score f(n').

20. The non-transitory computer readable medium of claim 17, the digital image manipulation process further comprising:
defining a second plurality of matching masks in the best-match related image; and
defining the segment of the best-match related image based on an area adjacent to each of the second plurality of matching masks in the best-match related image.

* * * * *